United States Patent Office 3,110,458
Patented Nov. 12, 1963

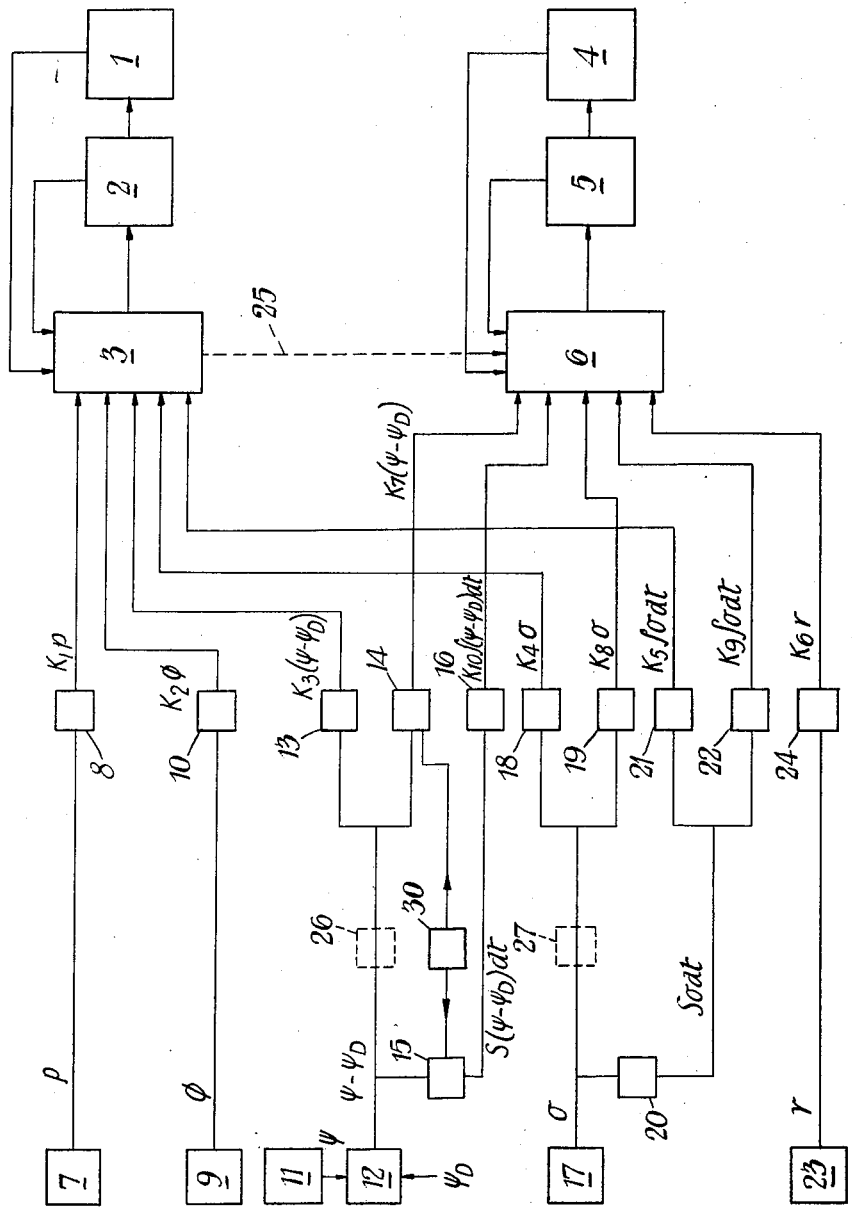

3,110,458
AUTOMATIC LANDING SYSTEMS FOR AIRCRAFT
Geoffrey Stanley Bishop, Stopsley, Luton, England, assignor to Elliott Brothers (London) Limited, London, England, a company of Great Britain
Filed Oct. 30, 1961, Ser. No. 148,610
Claims priority, application Great Britain Nov. 1, 1960
14 Claims. (Cl. 244—77)

This invention relates to improvements in automatic landing systems for aircraft.

When an aircraft is flown in a cross wind with its wings level it "crabs," i.e. the direction of its travel over the ground differs from the direction in which the fuselage is pointing by an angle known as the crab or drift angle. If, under these conditions, an aircraft is flying down the centre line of a runway preparatory to landing its wheels will not be pointing in the correct direction and so will experience an undesirable side load at the instant of touchdown.

A pilot minimises the side load by one of two methods (or a combination of the two). One is to "decrab" or "kick off the drift" during the last few seconds before touchdown by applying rudder to align the aircraft heading with the runway, while relying on the aircraft inertia to maintain its direction of travel substantially unchanged over this short time. The other method is to sideslip the aircraft, i.e. to fly deliberately banked so that the sideslip produced by the bank angle substantially compensates for any tendency to drift due to wind, and thus to keep both the aircraft heading and track simultaneously and continuously aligned with the runway during the final approach and landing.

For large transport aircraft in the approach configuration, aerodynamic lags are likely to be too great to permit the decrabbing manoeuvre to be carried out in the short time required to avoid an unacceptable sideways drift. Also, the manoeuvre should begin at a set time before touchdown, the time of which is difficult to predict accurately.

Basically, there are two flying controls, rudder and aileron, available for lateral control of a conventional aircraft, and with these it is possible to satisfy two independent conditions continuously. In the first method these two conditions are (a) aircraft tracking along runway centre line, (b) wings level, until a few seconds before touchdown, when condition (a) becomes "aircraft heading along runway centre line." In the second method, the two conditions are (a) aircraft tracking along runway centre line, (b) aircraft heading along runway centre line, and this mode of control is used for a long enough time before touchdown to ensure that the conditions are set.

It is an object of the present invention to provide an improved automatic landing system for aircraft whereby an aircraft is landed by the second method referred to above.

According to the present invention, an automatic aircraft landing system comprises means for deriving control signals as functions of the departure of the aircraft heading angle from the runway angle and of the lateral displacement of the aircraft relative to the runway and means for controlling the aircraft rudder and ailerons in response to the control signals in the sense to reduce such control signals to zero by causing the aircraft to head and track along the runway banked at an angle sufficient to compensate for any tendency to drift due to the wind.

More particularly, the invention provides an automatic aircraft landing system comprising means for deriving a first control signal as a function of the bank angle of the aircraft, means for deriving a second control signal as a function of the departure of the aircraft heading angle from the runway angle, means for deriving a third control signal as an integral function of such departure, means for deriving a fourth control signal as a function of the lateral displacement of the aircraft relative to the runway, means for deriving a fifth control signal as an integral function of such displacement, rudder control means responsive to the second, third, fourth and fifth control signals to control the rudder in the sense to reduce the second control signal to zero and cause the aircraft to head along the runway and aileron control means responsive to the first, second, fourth and fifth signals to control the ailerons in the sense to reduce the fourth control signal to zero and cause the aircraft to assume or maintain a bank angle sufficient to compensate for any tendency to drift due to wind.

More specifically stated, the invention provides an automatic landing system for aircraft comprising means for deriving aileron control signals in the form $K_1 p$, $K_2 \phi$, $K_3(\psi - \psi_D)$, $K_4 \sigma$ and $K_5 \int \sigma dt$, where $K_1$, $K_2$, $K_3$, $K_4$ and $K_5$ are gearing factors and $p$ is the roll rate of the aircraft, $\phi$ is the bank angle, $\psi$ is the heading angle, $\psi_D$ is the demanded heading or runway angle, $\sigma$ is the lateral displacement of the aircraft relative to the runway and $t$ is time, aileron control means for causing the ailerons to assume an aileron angle $\xi$ which is a function of the sum of the aileron control signals, means for deriving rudder control signals in the form $K_6 r$, $K_7(\psi - \psi_D)$, $K_8 \sigma$, $K_9 \int \sigma dt$ and $K_{10} \int (\psi - \psi_D) dt$, where $K_6$, $K_7$, $K_8$, $K_9$ and $K_{10}$ are gearing factors and $r$ is the yaw rate, and rudder control means responsive to the rudder control signals to cause the rudder to assume a rudder angle $\zeta$ which is a function of the sum of the rudder control signals.

One embodiment of the invention will now be described by way of example, reference being made to the accompanying block schematic diagram of an automatic landing system for aircraft.

In this example, the aircraft ailerons 1 are controlled by an actuator or actuators 2 under the control of a part 3 of an autopilot computer. The rudder or rudders 4 is or are controlled by an actuator or actuators 5 under the control of another part 6 of the autopilot computer. A roll rate gyroscope 7 is provided to derive a control signal as a function of the roll rate $p$ of the aircraft, this control signal being amplified by an amplifier 8 to provide a control signal to the part 3 of the autopilot computer in the form $K_1 p$ where $K_1$ is a gearing factor.

A vertical gyroscope 9 is provided to derive a control signal as a function of the bank angle $\phi$ of the aircraft, this control signal being amplified by an amplifier 10 to provide a control signal to the autopilot part 3 in the form $K_2 \phi$ where $K_2$ is a gearing factor. A directional gyroscope or gyrocompass 11 is provided to derive a signal as a function of the aircraft heading and this signal is supplied to a course deviation indicator 12 or other instrument having a facility for the pilot to set in the runway heading angle to derive a control signal which is a function of the departure of the aircraft heading $\psi$ from the runway heading $\psi_D$. This last-mentioned control signal is supplied to both amplifiers 13 and 14 and to an integrator 15. The amplifier 13 provides a control signal to the autopilot part 3 in the form $K_3(\psi - \psi_D)$ and the amplifier 14 provides a control signal to the autopilot part 6 in the form $K_7(\psi - \psi_D)$ where $K_3$ and $K_7$ are gearing factors. The output of the integrator 15 is amplified by an amplifier 16 to provide a control signal to the autopilot part 6 in the form $K_{10} \int (\psi - \psi_D) dt$.

A device 17 is provided to provide a signal which is a function of the lateral displacement $\sigma$ of the aircraft relative to the runway centre line. This device 17 may, for example, be an I.L.S. localiser receiver, a leader cable receiver or a leader beacon receiver or a combination of these. This displacement signal is supplied both to amplifiers 18 and 19 and to an integrator 20. The amplifier 18 provides a control signal to the autopilot part 3 in the form $K_4\sigma$ and the amplifier 19 provides a control signal to the autopilot part 6 in the form $K_8\sigma$, where $K_4$ and $K_8$ are gearing factors. The integrated output from the integrator 20 is supplied to amplifiers 21 and 22, the amplifier 21 supplying a control signal to the autopilot part 3 in the form $K_5\int\sigma dt$ and the amplifier 22 supplying a control signal to the autopilot part 6 in the form $K_9\int\sigma dt$. A yaw rate gyroscope 23 is provided to derive a signal as a function of the yaw rate $r$ of the aircraft, this signal being fed to an amplifier 24 the output of which is supplied to the autopilot part 6 in the form $K_6 r$ where $K_6$ is a gearing factor.

Position feedback is provided from the ailerons 1 to the autopilot part 3 and stabilising feedback is provided from the actuator 2 to the autopilot part 3 so that the ailerons 1 follow the command of the autopilot part 3 according to the equation $$\xi = K_1 p + K_2 \phi + K_3(\psi - \psi_D) K_4 \sigma + K_5 \int \sigma dt$$

where $\xi$ is the aileron angle.

Position feedback is provided from the rudder 4 to the autopilot part 6 and stabilising feedback is provided from the actuator 5 to the autopilot part 6 so that the rudder follows the command of the autopilot according to the equation $$\zeta = K_6 r + K_7(\psi - \psi_D) + K_8 \sigma + K_9 \int \sigma dt + K_{10} \int (\psi - \psi_D) dt$$

where $\zeta$ is the rudder angle.

The values of the gearing factors referred to above will differ for different aircraft and may be varied by self-adaptive means during a landing. Furthermore these factors may be frequency dependent; for instance the control signals $K_1 p$ and $K_6 r$ may be obtained from bandpass filters and the control signals $K_4 \sigma$ and $K_8 \sigma$ may be passed through phase-advancing devices which introduce a measure of rate stabilisation. Typical values for one aircraft are:

$K_1 = 1$; $K_2 = 1$; $K_3 = 1.25$; $K_4 = 5$
$K_5 = 0.1$; $K_6 = 3.3$; $K_7 = 1.25$; $K_8 = 5$
$K_9 = 0.1$ and $K_{10} = 0.1$ It will be appreciated that although these gearing factors have been described as being obtained from amplifiers 8, 10, 13, 14, 16, 18, 19, 21 and 22, they may, in practice, be derived within the autopilot parts 3 and 6 and/or from parametric gain adjusting devices. Additionally, some or all the rudder control signals derived from the course deviation indicator 12, the device 17 and the integrator 20 may be supplied to the autopilot part 6 from the autopilot part 3 as indicated by the dotted line 25, as will be understood.

Means 30 responsive to aircraft altitude, e.g. a barometric altimeter or a radio altimeter, is provided to switch the integrator 15 from the "off" to the "on" condition or, in other words, to vary the $K_{10}$ gearing factor from 0 to its selected value at a selected altitude as the aircraft approaches the runway. This means may also be such as to control the amplifier 14 to increase $K_7$ from a first to a second selected value. This altitude responsive means must respond a sufficient time, e.g. at least one minute, before touchdown to allow all the controls to operate in the intended manner and to be observed to do so and usually should be set to operate at a height not less than 200 ft. Means may also be provided to modify or disconnect the control signals automatically at or just prior to touchdown.

The operation of the system described is substantially as follows:

Before entering upon the landing phase the aircraft will normally be controlled by the autopilot in response to radio guidance signals possibly derived from the device 17. The control equations will be as set out above except that $K_{10}$ will be zero and $K_7$ may have the first selected value. At a selected altitude, e.g. at least 200 ft., the integrator 15 is switched on and $K_7$ may be increased to its second selected value. Rudder is thus applied to yaw the aircraft towards the runway. The resultant yaw applies aileron through the $K_3$ term and the aircraft banks into the wind. When a steady condition is obtained, the outputs of integrators 15 and 20 are no longer changing so that the desired conditions, i.e. $\sigma = 0$ and $\psi - \psi_D = 0$, are achieved, and the aircraft is flying with its heading and track aligned along the runway centre line and banked into the wind at an angle sufficient to compensate for any drift due to wind.

It will be appreciated that although the invention has been described in its application to a position command system, it can also be used with a rate-rate system, i.e. one in which the rates of change of the aforementioned demand signals are made to demand control surface rates. For instance, the position feedback from the ailerons 1 to the autopilot part 3 can be omitted, thus converting the actuator 2 into a rate actuator, the gyroscope 9 can be replaced by a rate gyroscope, the rate gyroscopes 7 and 23 can be replaced by angular accelerometers, the integrators 15 and 20 can be omitted and differentiators introduced as indicated in dotted lines at 26 and 27.

It is also possible on some aircraft to omit the auto-stabilisation terms from the gyroscopes 7 and 23, or to replace them with the outputs from the vertical gyroscope 9 and gyrocompass 11, passed through differentiators or other suitable filters. This applies equally to a position demand system or a rate demand system.

What I claim is:

1. An automatic aircraft landing system comprising means for deriving a first control signal as a function of the bank angle of the aircraft, means for deriving a second control signal as a function of the departure of the aircraft heading angle from the runway angle, means for deriving a third control signal as an integral function of such departure, means for deriving a fourth control signal as a function of the lateral displacement of the aircraft relative to the runway, means for deriving a fifth control signal as an integral function of such displacement, rudder control means responsive to the second, third, fourth and fifth control signals to control the rudder in the sense to reduce the second control signal to zero and cause the aircraft to head along the runway and aileron control means responsive to the first, second, fourth and fifth signals to control the ailerons in the sense to reduce the fourth control signal to zero and cause the aircraft to assume or maintain a bank angle sufficient to compensate for any tendency to drift due to wind.

2. A system according to claim 1 wherein altitude responsive means is provided to switch said third signal deriving means from an inoperative condition when the aircraft altitude exceeds a predetermined value to an operative condition when the aircraft altitude is less than said predetermined value.

3. A system according to claim 2 wherein said altitude responsive means is arranged to modify the functional relationship of said second control signal to the departure of the aircraft heading angle from the runway angle to which the rudder control means responds from one relationship when the aircraft altitude exceeds said predetermined value to another relationship when the aircraft altitude is below said predetermined value.

4. A system according to claim 1 wherein the rudder control means includes a rudder computer device responsive to the rudder control signals and a rudder actuator operable by the rudder computer device to control the rudder and the aileron control means includes an aileron computer device responsive to the aileron control signals and an aileron actuator operable by the aileron computer device to control the ailerons.

5. A system according to claim 4 wherein a position feedback loop is provided from the rudder to the rudder computer device and a position feedback loop is provided from the ailerons to the aileron computer device.

6. A system according to claim 4 wherein a stabilising feedback loop is provided from the rudder actuator to the rudder computer device and a stabilising feedback loop is provided from the aileron actuator to the aileron computer.

7. A system according to claim 5 wherein a stabilising feedback loop is provided from the rudder actuator to the rudder computer device and a stabilising feedback loop is provided from the aileron actuator to the aileron computer.

8. An automatic landing system for aircraft comprising means for deriving aileron control signals in the form $K_1 p$, $K_2 \phi$, $K_3(\psi - \psi_D)$, $K_4 \sigma$ and $K_5 \int \sigma dt$, where $K_1$, $K_2$, $K_3$, $K_4$ and $K_5$ are gearing factors and $p$ is the roll rate of the aircraft, $\phi$ is the bank angle, $\psi$ is the heading angle, $\psi_D$ is the demanded heading or runway angle, $\sigma$ is the lateral displacement of the aircraft relative to the runway and $t$ is time, aileron control means for causing the ailerons to assume an aileron angle $\xi$ which is a function of the sum of the aileron control signals, means for deriving rudder control signals in the form $K_6 r$, $K_7(\psi - \psi_D)$, $K_8 \sigma$, $K_9 \int \sigma dt$, and $K_{10} \int (\psi - \psi_D) dt$, where $K_6$, $K_7$, $K_8$, $K_9$ and $K_{10}$ are gearing factors and $r$ is the yaw rate, and rudder control means responsive to the rudder control signals to cause the rudder to assume a rudder angle $\zeta$ which is a function of the sum of the rudder control signals.

9. A system according to claim 8 wherein altitude responsive means is provided to make the rudder control signal represented by $K_{10} \int (\psi - \psi_D) dt$ equal to zero when the aircraft altitude exceeds a predetermined magnitude.

10. A system according to claim 9 wherein the altitude responsive means is arranged to modify the value of $K_7$ from one value when the aircraft altitude is less than said predetermined magnitude to another value when the aircraft altitude exceeds said predetermined magnitude.

11. A system according to claim 8 wherein the functional relationship of the aileron angle to the aileron signals is in the form $$\xi = K_1 p + K_2 \phi + K_3(\psi - \psi_D) + K_4 \sigma + K_5 \int \sigma dt$$

12. A system according to claim 8 wherein the functional relationship of the rudder angle to the rudder control signals is in the form $$\zeta = K_6 r + K_7(\psi - \psi_D) + K_8 \sigma + K_9 \int \sigma dt + K_{10} \int (\psi - \psi_D) dt$$

13. A system according to claim 8 wherein the rudder control means includes a rudder computer device responsive to the rudder control signals and a rudder actuator operable by the rudder computer device to control the rudder and the aileron control means includes an aileron computer device responsive to the aileron control signals and an aileron actuator operable by the aileron computer device to control the ailerons.

14. An automatic landing system for aircraft comprising means for deriving aileron control signals in the form of $$K_1 p, K_2 \phi, K_3(\psi - \psi_D), K_4 \sigma \text{ and } K_5 \int \sigma dt$$

where $K_1$, $K_2$, $K_3$, $K_4$ and $K_5$ are gearing factors and $p$ is the roll rate of the aircraft, $\phi$ is the bank angle, $\psi$ is the heading angle, $\psi_D$ is the demanded heading or runway angle, $\sigma$ is the lateral displacement of the aircraft relative to the runway and $t$ is the time, aileron control means for causing the ailerons to assume an aileron angle $\xi$ where $$\xi = K_1 p + K_2 \phi + K_3(\psi - \psi_D) + K_4 \sigma + K_5 \int \sigma dt$$

means for deriving rudder control signals in the form $K_6 r$, $K_7(\psi - \psi_D)$, $K_8 \sigma$, $K_9 \int \sigma dt$ and $K_{10} \int (\psi - \psi_D) dt$, where $K_6$, $K_7$, $K_8$, $K_9$ and $K_{10}$ are gearing factors and $r$ is the yaw rate, and rudder control means responsive to the rudder control signals to cause the rudder to assume a rudder angle $\zeta$ where $$\zeta = K_6 r + K_7(\psi - \psi_D) + K_8 \sigma + K_9 \int \sigma dt + K_{10} \int (\psi - \psi_D) dt$$

References Cited in the file of this patent

UNITED STATES PATENTS 2,808,999    Chenery   ---------------- Oct. 8, 1957